UNITED STATES PATENT OFFICE.

MAX PHILLIPS, OF EVANSVILLE, WISCONSIN.

MANUFACTURE OF CHLOROFORM.

1,359,099. Specification of Letters Patent. Patented Nov. 16, 1920.

No Drawing. Application filed August 13, 1920. Serial No. 403,400.

(FILED UNDER THE ACT OF MARCH 3, 1883, 22 STAT. L., 625.)

*To all whom it may concern:*

Be it known that I, MAX PHILLIPS, a citizen of the United States of America, and an employee of the Department of Agriculture, residing in the city of Evansville, county of Rock, State of Wisconsin, (whose post-office address is Department of Agriculture, Washington, D. C.,) have invented certain new and useful Improvements in the Manufacture of Chloroform, of which the following is a specification.

This application is made under the act of March 3, 1883, chapter 143 (22 Stat., 625), and the invention herein described and claimed may be used by the Government of the United States or any of its officers or employees in the prosecution of work for the Government, and any person in the United States, either in public or private work, without payment to me of any royalty thereon.

The present invention relates to the production of chloroform or trichlormethane from secondary alcohols, notably isopropyl alcohol, which can be made by passing unsaturated hydrocarbons rich in propylene into sulfuric acid and subsequently hydrolyzing the product and getting isopropyl alcohol; or by any other method.

Chloroform has hitherto been prepared by treating either ethyl alcohol or acetone with a suitable chlorinating agent, such as, chlorid of lime, and then separating the chloroform formed, by distillation, or in any other suitable manner. I have found that good yields of chloroform can be obtained from the much cheaper alcoholic product made by passing unsaturated hydrocarbons, rich in propylene, into sulfuric acid as above described. The product consists principally of secondary alcohols, notably, secondary propyl, or iso-propyl alcohol mixed with other higher alcohols. This when treated with a suitable alkaline chlorinating agent, such as, chlorid of lime, chloroform, along with certain fatty acids such as formic and acetic acids are formed. The chief product, however, consists of chloroform.

The preparation of chloroform by this process may be conveniently carried out as follows, without, however, limiting myself to the exact conditions hereafter described: One part by weight of the secondary alcohols is added to a mixture consisting of five parts by weight of chlorid of lime, and twenty parts by weight of water. The mixture is heated and the chloroform formed distilled over. The chloroform in the distillate separates out as a separate layer which can easily be separated from the non-chloroform portion. The chloroform is then washed with a dilute solution of sodium hydroxid, then with water, dehydrated and distilled.

Having now fully described my invention, what I claim and desire to secure by Letters Patent is—

1. A process of making chloroform which comprises treating the alcoholic product, obtained by passing unsaturated hydrocarbons rich in propylene into sulfuric acid subsequently hydrolyzing the alkyl sulfates, with chlorid of lime.

2. A process of making chloroform which comprises treating secondary propyl or iso-propyl alcohol with chlorid of lime.

In testimony whereof, I affix my signature in the presence of two subscribing witnesses.

MAX PHILLIPS.

Witnesses:
R. H. L. SEATON,
L. S. HULBERT.